United States Patent [19]

Nation

[11] 4,032,204
[45] June 28, 1977

[54] ADJUSTABLE MOUNTING ARRANGEMENT FOR ELECTRONIC APPARATUS

[75] Inventor: Melvin Stanley Nation, Lombard, Ill.

[73] Assignee: Motorola, Inc., Schaumburg, Ill.

[22] Filed: June 21, 1976

[21] Appl. No.: 698,377

[52] U.S. Cl. ............................... 312/7 R; 16/119;
220/4 C; 220/96; 224/42.46 R; 248/201;
248/289 R; 325/352; 403/73
[51] Int. Cl.² ........................................ B60R 11/02
[58] Field of Search ............. 312/7 R; 403/68, 73;
248/201, 202, 289; 16/119, 125; 325/119,
352, 353, 355, 312, 361; 224/42.46 R, 42.45
R, 42.42 R, 29 R; 220/4 C, 96

[56] References Cited

UNITED STATES PATENTS

| | | | |
|---|---|---|---|
| 1,243,732 | 10/1917 | Goss et al. | 248/289 |
| 3,124,266 | 3/1964 | Morgan | 220/96 |
| 3,685,708 | 8/1972 | Merrington | 224/42.45 R |

Primary Examiner—Paul R. Gilliam
Assistant Examiner—Alex Grosz
Attorney, Agent, or Firm—Margaret Marsh Parker; James W. Gillman

[57] ABSTRACT

An electronic apparatus as for use in a vehicle is adjustably mounted on a rigid support member by means of rigid inserts which are releasably retained by the walls of each portion of the resilient plastic housing. When the housing portions are mated, the inserts are fixedly retained. If damaged by cross-threading, the insert can be easily and inexpensively replaced. A coined detent surface on an exposed portion of the insert is engaged by another coined detent surface on the rigid support. A thumb screw holds the detent surfaces together, and allows for changing the position of the apparatus. All components including the printed circuit board are supported by the chassis which is supported only by the housing. Thus the plastic housing provides vibration and shock attenuation for the chassis and its associated components.

8 Claims, 3 Drawing Figures

ADJUSTABLE MOUNTING ARRANGEMENT FOR ELECTRONIC APPARATUS

BACKGROUND OF THE INVENTION

This invention relates to electronic apparatus mounted as in a vehicle, and particularly to an improved method of attenuating shock and vibration between the vehicle and the printed circuit board components in the apparatus.

In a vehicular installation, several considerations must be taken into account. There must be a strong, rigid structure for supporting the weight of the apparatus within a vehicle which is subject to constant vibration — severe vibration in the case of off-the-road vehicles. Since electronic devices, no matter how well designed and constructed, are still subject to damage from vibration, it is desirable to attenuate this vibration as much as possible before it is transmitted to the most vulnerable parts of the apparatus.

In the prior art, most such equipment has the chassis structure attached directly to the support structure, so that a direct path for vibration exists from the vehicle to the chassis and its attached components. Thus, if the mounting threads which are tapped into the chassis wall become damaged or stripped, as by cross-threading, the entire chassis unit has to be replaced at considerable trouble and expense.

In an effort to solve some of these problems, metal mounting inserts have been molded into the walls of the housing, producing attenuation in the amount of vibration reaching the chassis components, since a resilient housing will absorb a considerable amount of vibration. The cross-threading problem was reduced but not solved, since damaged mounting threads still required replacing at least a portion of the housing. Also, the cost of the housing is increased for two reasons. First, a separate, hand operation is required in that, before molding, a metal insert must be carefully positioned by hand within each mold before the plastic is injected. More important, injection molding one substance around another, e.g. plastic and metal, tends to cause problems such as deformation or short filling. For the latter reason, the incidence of rejects is greatly increased. Also, the walls of the housing must be heavier in the area of a molded insert, making the walls less resilient and reducing the vibration attenuation.

SUMMARY OF THE INVENTION

It is therefore an object of the present invention to provide a means of mounting electronic apparatus as in a vehicle, which includes improved vibration attenuation while reducing original and repair costs.

These objectives are accomplished in a mounting arrangement constructed according to the invention by providing rigid mounting and detent members which are inserted into "pockets" within the housing walls. Thinner walls can be provided, thus increasing vibration attenuation, and less plastic is required. Molding rejects are also drastically reduced. The inserted piece costs only a small fraction of the price of a housing portion or a complete chassis and can be replaced in a moment if its threads are damaged.

Thus, a mounting arrangement according to the invention includes rigid inserts, each having a first coined detent surface, a flange and a first threaded fastener portion, and two mating housing portions, each releasably retaining substantially half of one of the insert flanges. A second fastener portion engages each first fastener portion, and a support member having a second coined detent surface receives one of the fastener portions, whereby the housing is attached to and adjustably positioned relative to the support member.

DESCRIPTION OF A PREFERRED EMBODIMENT

Figure 1:
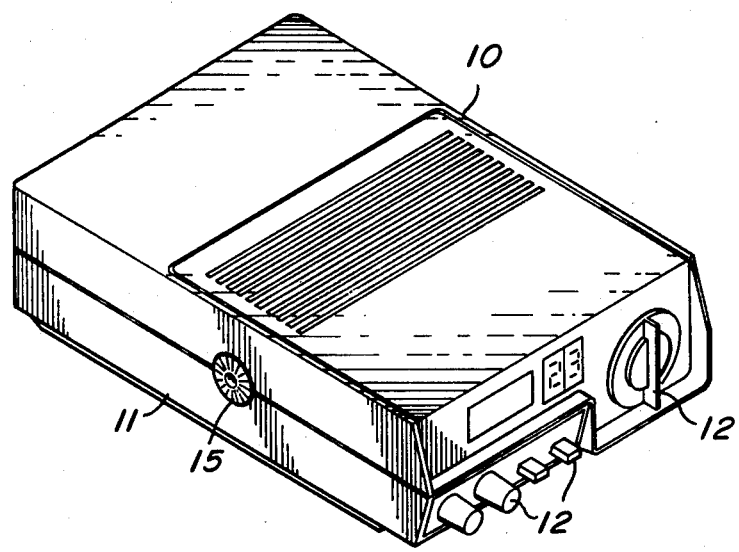
FIG. 1 is an overall view of an electronic apparatus embodying the invention.
Figure 3:
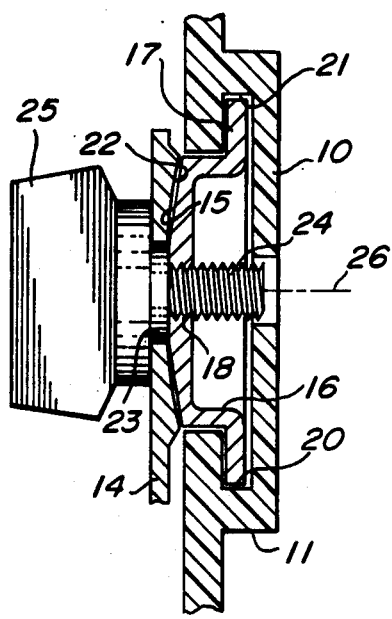
FIG. 3 is a sectional view of the embodiment of FIG. 2 taken along the line 3—3.
Figure 2:
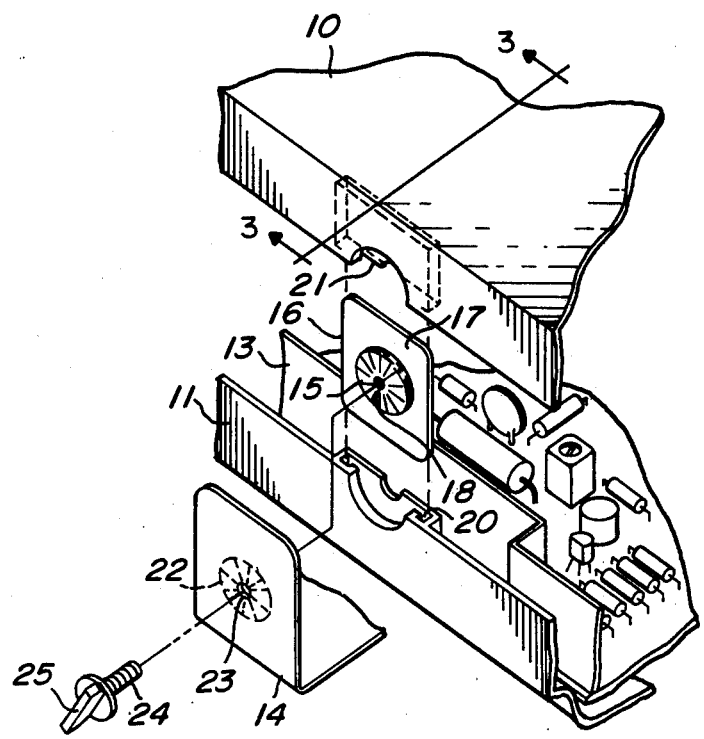
FIG. 2 is an exploded view of a portion of the apparatus of FIG. 1 as constructed in accordance with the invention.

In the electronic apparatus of FIG. 1, utilizing the present invention, a resilient plastic housing is shown having a top portion 10 and lower portion 11. Various controls and displays are indicated generally as reference numeral 12, protruding through the front walls of housing portions 10 and 11. The means of supporting the controls, etc., 12 and a chassis 13 with its associated components (FIG. 2) within the housing are disclosed in a copending application, Ser. No. 698,379, filed as of even date with the present application, by a different applicant, with the same assignee as the present application. The means of supporting the chassis, etc. form no part of the present application other than to indicate that the chassis 13 is not directly attached to any portion of a support structure 14 (FIGS. 2 and 3). Visible in FIG. 1 is a detent portion 15 of the housing mounting arrangement which is described in detail with respect to FIGS. 2 and 3. An identical arrangement (not shown) is to be found on the opposite side of the housing.

In FIG. 2 the housing portions 10 and 11 are shown unmated. Contained within the portions 10 and 11 when mated is the chassis 13 and its associated components. A metal insert 16 has a flange 17, the coined detent surface 15 and, centered in the surface 15, a threaded aperture 18. A portion of the flange 17 of the insert 16 is releasably retained when inserted in a pocket 20 integrally formed with the resilient housing portion 11. Another pocket 21, which is not necessarily identical to the pocket 20, is integrally formed with the housing portion 10, and would also receive a portion of the flange 17 of the insert 16. While the housing portions 10 and 11 are mated, the insert 16 is non-releasably and non-rotatably retained within the housing walls with only the detent surface 15 and the aperture 18 visible. A small portion of the support structure 14 is shown in FIGS. 2 and 3. This structure is rigidly attached to the vehicle and has a coined detent surface 22 (shown dotted in) for mating with detent surface 15. An unthreaded aperture 23 is centered in the detent surface 22. A thumb screw 24 with plastic knob 25 is shown for attaching the mated portions 10 and 11 of the housing to the support structure 14 by means of insert 16. It is to be understood that the insert 16 might include a male threaded portion and the knob 25 might contain a threaded aperture. Other means of attaching the insert 16 to the structure 14 may also be used within the scope of the invention. The preferred embodiment of the insert is as shown in FIG. 2 and consists of a single stamped piece of metal. As shown, the insert 16 would be die cut, the center hole pierced, the aperture material extruded and tapped, then the larger diameter for the detent surface would be drawn and the detent coining stamped in.

FIG. 3 shows the embodiment of FIG. 2 as cut along the line 3—3, but with the parts positioned as within a completed assembly. The housing portions 10 and 11 are mated at the plane indicated by numeral 26. Flange 17 of the insert 16 is here contained within the pockets 20 and 21 of the housing portions. The insert 16 has been attached to the support structure 14 by means of the thumb screw 24 and the threaded aperture 18. To reposition the apparatus relative to the support structure (and thus to the user who would be seated near the support structure), the thumb screws (one on each side of the housing) are loosened to allow the detent surfaces to separate slightly. The housing of the apparatus can then be tilted up or down and the thumb screws again tightened to hold the housing in the new position.

As mentioned hereinabove, when a detent insert is molded into the housing walls, the walls must be made heavier, and therefore less resilient. Thus the present invention provides a mounting arrangement for an electronic apparatus which provides improved vibration attenuation (reduced shock damage) with simpler, less expensive parts. The invention has significant value in installations of electronic equipment where vibration is a serious problem, as in a vehicle, particularly when off paved roads.

What is claimed is:

1. A mounting arrangement for supporting and positioning an electronic apparatus, the arrangement comprising:
    rigid insert means, each having a flange means, a first integral fastener means, and a first positioning means;
    resilient plastic housing means comprising two mating portions, each housing portion being adapted to releasably retain a substantial portion of the insert flange means, the insert means being non-releasably and non-rotatably retained within the housing when the housing portions are mated;
    a rigid support member including a second positioning means;
    a second fastener means adapted for engagement with each first fastener means for attaching the housing means to the support means and for bringing the first positioning means into engagement with the second positioning means for positioning the apparatus housing means.

2. The mounting arrangment according to claim 1 wherein the first positioning means is a first coined detent surface, and the second positioning means is a second coined detent surface for mating with the first detent surface.

3. The mounting arrangement according to claim 1 wherein the first fastener means is an aperture having threaded walls, and the second fastener means is a screw means.

4. The mounting arrangement according to claim 1 wherein the rigid insert means is a metal insert.

5. A mounting arrangement for supporting and positioning an electronic apparatus within a vehicle, the arrangement comprising:
    rigid insert means, each having a flange means a first integral fastener means and a first positioning means;
    resilient plastic housing means comprising two mating portions, each housing portion being adapted to releasably retain a substantial portion of the insert flange means, the insert means being non-releasably and non-rotatably retained within the housing when the housing portions are mated;
    a rigid support member mounted within the vehicle and including a second positioning means; and
    a second fastener means for engagement with each first fastener means for attaching the housing to the support means and for bringing the first positioning means into engagement with the second positioning means for positioning the apparatus housing means.

6. The mounting arrangement according to claim 5 wherein the first positioning means is a first coined detent surface, and the second positioning means is a second coined detent surface for mating with the first detent surface.

7. The mounting arrangement according to claim 5 wherein the first fastener means is an aperture having threaded walls, and the second fastener means is a screw means.

8. The mounting arrangement according to claim 5 wherein the rigid insert means is a metal insert.

* * * * *